US012711611B2

(12) United States Patent
Liu et al.

(10) Patent No.: US 12,711,611 B2
(45) Date of Patent: Aug. 18, 2026

(54) REFERENCELESS IMAGE EVALUATION METHOD FOR CAPSULE ENDOSCOPE, ELECTRONIC DEVICE, AND MEDIUM

(71) Applicant: ANKON TECHNOLOGIES CO., LTD, Wuhan (CN)

(72) Inventors: Hui Liu, Wuhan (CN); Hang Zhang, Wuhan (CN); Wenjin Yuan, Wuhan (CN); Zhiwei Huang, Wuhan (CN); Hao Zhang, Wuhan (CN)

(73) Assignees: ANKON TECHNOLOGIES CO., LTD, Wuhan (CN); ANX IP HOLDING PTE. LTD., Singapore (SG)

( * ) Notice: Subject to any disclaimer, the term of this patent is extended or adjusted under 35 U.S.C. 154(b) by 687 days.

(21) Appl. No.: 18/027,921

(22) PCT Filed: Sep. 17, 2021

(86) PCT No.: PCT/CN2021/119068

§ 371 (c)(1),
(2) Date: Oct. 4, 2023

(87) PCT Pub. No.: WO2022/057897

PCT Pub. Date: Mar. 24, 2022

(65) Prior Publication Data

US 2024/0029243 A1 Jan. 25, 2024

(30) Foreign Application Priority Data

Sep. 21, 2020 (CN) ......................... 202010992105.5

(51) Int. Cl.
*G06T 7/00* (2017.01)
*G06T 5/10* (2006.01)
(Continued)

(52) U.S. Cl.
CPC .............. *G06T 7/0012* (2013.01); *G06T 5/10* (2013.01); *G06V 10/56* (2022.01); *G06V 10/60* (2022.01);
(Continued)

(58) Field of Classification Search
CPC ..................... G06T 7/0012; G06T 5/10; G06T 2207/10068; G06T 2207/20052;
(Continued)

(56) References Cited

U.S. PATENT DOCUMENTS

2018/0308235 A1* 10/2018 Yuan ......................... G06T 7/70

FOREIGN PATENT DOCUMENTS

CN 111080577 A * 4/2020 ........... G06T 7/0012
CN 111385567 A * 7/2020 ....... H04N 21/44008
(Continued)

*Primary Examiner* — Jennifer Mehmood
*Assistant Examiner* — Vaisali Rao Koppolu
(74) *Attorney, Agent, or Firm* — Treasure IP Group, LLC

(57) ABSTRACT

A referenceless image evaluation method for a capsule endoscope, an electronic device, and a medium. The method comprises: acquiring image quality evaluation scores and image content evaluation scores corresponding to respective original images; and determining, according to weights of the image content evaluation scores and weights of the image quality evaluation scores, a comprehensive score for each image currently being evaluated. The referenceless image evaluation method for a capsule endoscope employs various evaluation models to evaluate the image quality and content of a number of original images taken in the same detection region. The results of these evaluations are then combined to produce comprehensive scores for the numerous original images of the same region. Through the comprehensive scores, high-quality images can be quickly
(Continued)

screened out, and thus the screening of the original images can be accelerated and the identification accuracy be improved.

18 Claims, 6 Drawing Sheets

(51) Int. Cl.
*G06V 10/56* (2022.01)
*G06V 10/60* (2022.01)

(52) U.S. Cl.
CPC ............... *G06T 2207/10068* (2013.01); *G06T 2207/20052* (2013.01); *G06T 2207/20132* (2013.01); *G06T 2207/30168* (2013.01)

(58) Field of Classification Search
CPC . G06T 2207/20132; G06T 2207/30168; G06T 2207/10024; G06T 2207/20081; G06V 10/56; G06V 10/60; G06V 10/44; A61B 1/00009; A61B 1/041; G06F 18/214; G06F 18/2411
See application file for complete search history.

(56) References Cited

FOREIGN PATENT DOCUMENTS

CN 111401324 A * 7/2020 .......... G06F 18/2411
CN 111709914 A * 9/2020 ........... G06F 18/253

* cited by examiner

Input original images into a preset image quality evaluation model and a preset image content evaluation model, so as to acquire image quality evaluation scores and image content evaluation scores corresponding to the original images Determine, according to weight values of the image content evaluation scores and weight values of the image quality evaluation scores, a comprehensive score for each image currently being evaluated

FIG. 1

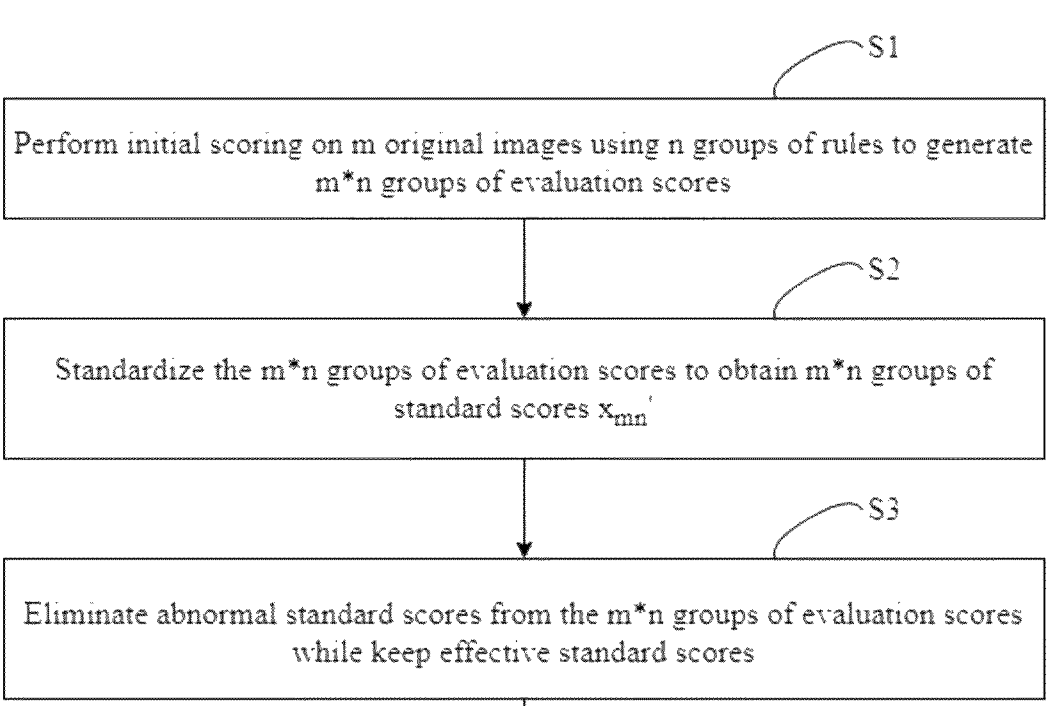

FIG. 2

Analyze each preprocessed image for quality evaluation to extract a corresponding image quality evaluation characteristic value, where the image quality evaluation characteristic value comprises: at least one of a proportion fb1 of a first overexposed pixel, a proportion fb2 of a first dark pixel, a proportion fb3 of a high-frequency coefficient, and a characteristic value $f_{bri}$ obtained by a BRISQUE algorithm

M2

Divide the preprocessed images for quality evaluation into a first training set and a first testing set according to a predetermined ratio, train data of the first training set by using a support vector machine, and verify by using data of the first testing set to obtain the image quality evaluation model

FIG. 3

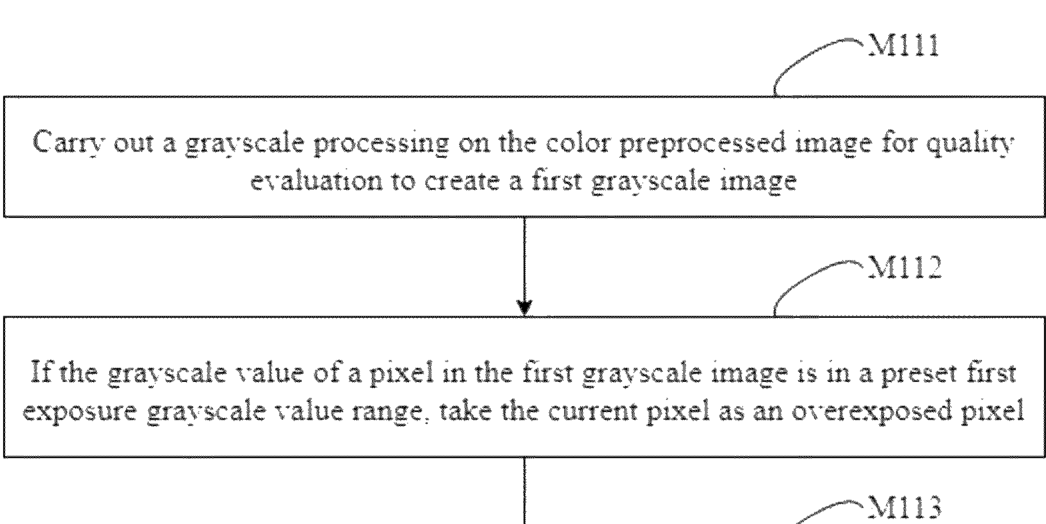

M113

Take the ratio of the total number of overexposed pixels to the total number of pixels in the first grayscale image as the proportion fb1 of the first overexposed pixel

FIG. 4

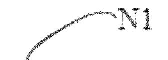

Analyze each preprocessed image for content evaluation to extract a corresponding image content evaluation characteristic value, where the image content evaluation characteristic value comprises: at least one of a proportion fc1 of a non-red pixel, a proportion fc2 of a second overexposed pixel, a proportion fc3 of a second dark pixel, a number fc4 of dot impurities, and a color characteristic, where the color characteristic comprises at least one of a first color characteristic fc5, a second color characteristic fc6, and a third color characteristic fc7

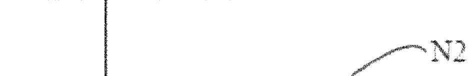

Divide the preprocessed images for content evaluation into a second training set and a second testing set according to a predetermined ratio, train data of the second training set by using a support vector machine, and verify by using data of the second testing set to obtain an image content evaluation mode

FIG. 7

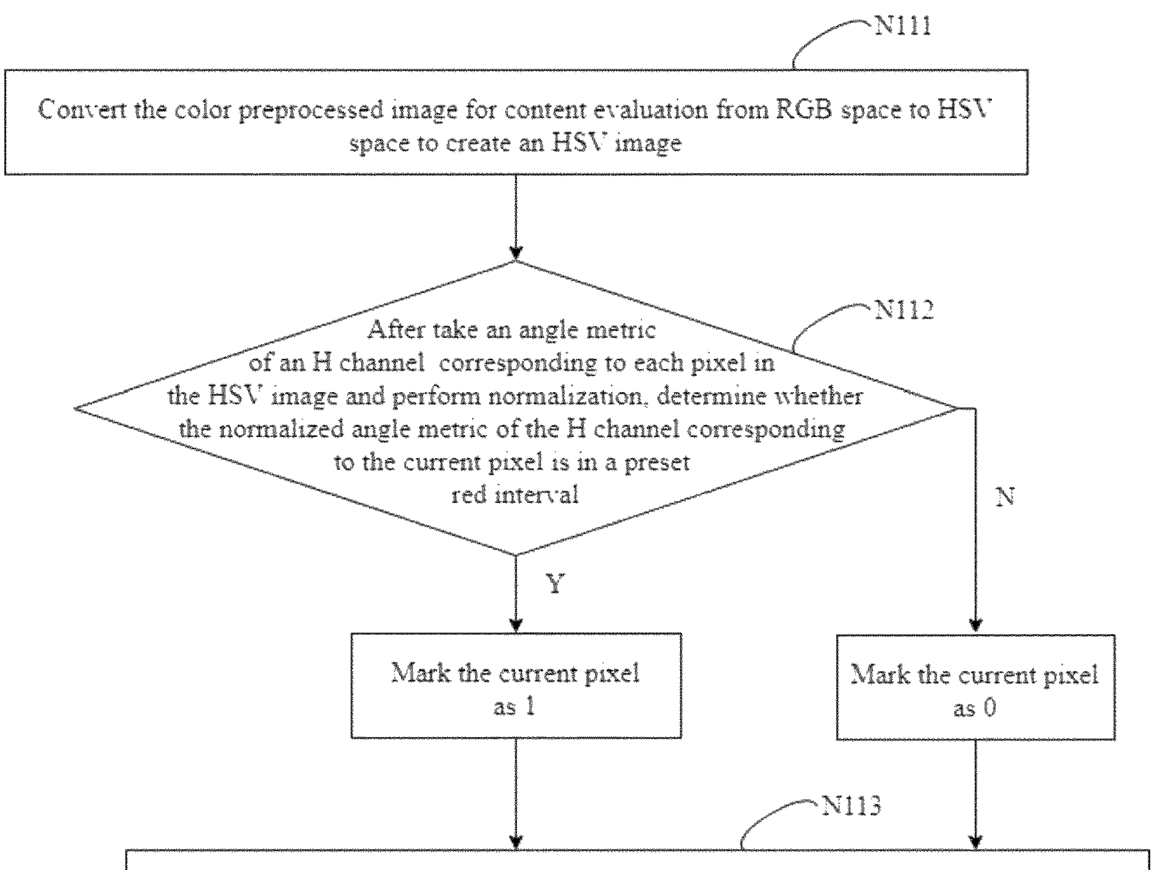

FIG. 8

REFERENCELESS IMAGE EVALUATION METHOD FOR CAPSULE ENDOSCOPE, ELECTRONIC DEVICE, AND MEDIUM

CROSS-REFERENCE OF RELATED APPLICATIONS

The application is a National Phase Application of PCT International Application No. PCT/CN2021/119068, International Filing Date Sep. 17, 2021, published Mar. 24, 2022 as International Publication Number WO2022/057897A1, which claims priority from Chinese Patent Application No. 202010992105.5, filed Sep. 21, 2020, all of which are incorporated herein by reference in their entirety.

FIELD OF INVENTION

The present invention relates to the field of medical equipment imaging, and more particularly to a referenceless image evaluation method for a capsule endoscope, an electronic device, and a medium.

BACKGROUND

A capsule endoscope is a medical device that integrates core components such as a camera and a wireless transmission antenna within a capsule that can be swallowed by a subject. During an examination, the subject swallows the capsule endoscope into body, and the capsule endoscope captures images of the digestive tract of the subject and transmits the images to the outside to perform medical examinations based on the images.

The capsule endoscope often instantaneously captures a plurality of images for the same examination site, and in the prior art, a physician is required to subjectively evaluate the quality of each image and assign a score for each image. An auxiliary evaluation provided by the physician is typically a comprehensive score on the cleanliness and sharpness of the image.

However, an automatic mode prevents personal intervention in operations such as focusing and exposure when the image is captured, which leads to inconsistent image quality. In addition, the environment where the capsule captures images is complicated, frequently contains impurities such as mucus and bile, and differs from person to person, so it is challenging to select the best image merely by a subjective evaluation of image quality.

SUMMARY OF THE INVENTION

To solve the problems above, the present invention provides a referenceless image evaluation method for a capsule endoscope, an electronic device, and a medium.

In order to achieve one of the above-mentioned objects of the present invention, an embodiment of the present invention provides a referenceless image evaluation method for a capsule endoscope. The method comprises: inputting original images into a preset image quality evaluation model and a preset image content evaluation model, to acquire image quality evaluation scores and image content evaluation scores corresponding to the original images; and determining, according to weight values of the image content evaluation scores and weight values of the image quality evaluation scores, a comprehensive score for each image currently being evaluated, wherein a weighting coefficient value corresponding to the weighted value is determined according to the weight of the image quality evaluation score.

In an embodiment of the present invention, a method for constructing the image quality evaluation model comprises:

analyzing each original image to extract a corresponding image quality evaluation characteristic value, wherein the image quality evaluation characteristic value comprises: at least one of a proportion fb1 of a first overexposed pixel, a proportion fb2 of a first dark pixel, a proportion fb3 of a high-frequency coefficient, and a characteristic value $f_{bri}$ obtained by a BRISQUE algorithm; and dividing original images into a first training set and a first testing set according to a predetermined ratio, training data of the first training set by using a support vector machine, and verifying by using data of the first testing set to obtain the image quality evaluation model;

wherein, both the data of the first training set and the data of the first testing set comprise image quality calculation scores and image quality evaluation characteristic values corresponding to the original images.

In an embodiment of the present invention, before analyzing each preprocessed image for quality evaluation to extract the corresponding image quality evaluation characteristic value, the method further comprises:

clipping the original image at a preset size [W, H] with the center of the original image as a center point to obtain a preprocessed image for quality evaluation for extracting the image quality evaluation characteristic value;

wherein, W∈[¼*M, ⅚*M] and H∈[¼*N, ⅚*N], [M, N] represent the size of the original image;

after analyzing each preprocessed image for quality evaluation to extract the corresponding image quality evaluation characteristic value, the method further comprises:

normalizing each image quality evaluation characteristic value into a corresponding preset normalization interval.

In an embodiment of the present invention, a method for extracting the proportion fb1 of the first overexposed pixel comprises:

carrying out a grayscale processing on the color preprocessed image for quality evaluation to create a first grayscale image;

if the grayscale value of a pixel in the first grayscale image is in a preset first exposure grayscale value range, taking the current pixel as an overexposed pixel; and taking the ratio of the total number of overexposed pixels to the total number of pixels in the first grayscale image as the proportion fb1 of the first overexposed pixel.

In an embodiment of the present invention, the method further comprises:

adjusting the value of the proportion fb1 of the first overexposed pixel to 0 if the proportion fb1 of the first overexposed pixel is less than a preset fourth value.

In an embodiment of the present invention, a method for extracting the proportion fb2 of the first dark pixel comprises:

carrying out a grayscale processing on the color preprocessed image for quality evaluation to create a first grayscale image;

if the grayscale value of a pixel in the first grayscale image is in a preset first dark pixel value range, taking the current pixel as a dark pixel; and taking the ratio of the total number of dark pixels to the total number of pixels in the first grayscale image as the proportion fb2 of the first dark pixel.

In an embodiment of the present invention, the method further comprises:

adjusting the value of the proportion fb2 of the first dark pixel to 0 if the proportion fb2 of the first dark pixel is not greater than a preset fifth value.

In an embodiment of the present invention, a method for extracting the proportion fb3 of the high frequency coefficient comprises:

carrying out a grayscale processing on the color preprocessed image for quality evaluation to create a first grayscale image;

performing a block DCT on the first grayscale image to obtain the proportion fb3 of the high frequency coefficient;

fb3=length (Y<m), Y=ln(|dct(I_gray, block)|);

wherein, I_gray represents the first grayscale image;

dct(I_gray, block) represents performing a two-dimensional DCT on the first gray image I_gray with a size of block;

block=[WD, HD] represents the block size of the first grayscale image, where WD, HD∈[2, 2^2, 2^3, . . . , 2^n] on the premise of not exceeding the size of the first grayscale image;

ln represents a natural logarithm transformation with e as the base; and length(Y<m) represents the number less than m in the statistic Y, and the value range of m is [−10, 0].

In an embodiment of the present invention, a method for constructing the image content evaluation model comprises:

analyzing each original image to extract a corresponding image content evaluation characteristic value, wherein the image content evaluation characteristic value comprises: at least one of a proportion fc1 of a non-red pixel, a proportion fc2 of a second overexposed pixel, a proportion fc3 of a second dark pixel, a number fc4 of dot impurities, and a color characteristic, wherein the color characteristic comprises at least one of a first color characteristic fc5, a second color characteristic fc6, and a third color characteristic fc7;

dividing original images into a second training set and a second testing set according to a predetermined ratio, training data of the second training set by using a support vector machine, and verifying by using data of the second testing set to obtain an image content evaluation model;

wherein, both the data of the second training set and the data of the second testing set comprise image quality calculation scores and image content evaluation characteristic values corresponding to the original images.

In an embodiment of the present invention, before analyzing each original image to extract the corresponding image content evaluation characteristic value, the method further comprises:

clipping the original image at a preset size [W, H] with the center of the original image as a center point to obtain a preprocessed image for content evaluation for extracting the image content evaluation characteristic value;

wherein, W∈[¼*M, ⅚*M] and H∈[¼*N, ⅚*N], [M, N] represent the size of the original image;

after analyzing each preprocessed image for content evaluation to extract the corresponding image content evaluation characteristic value, the method further comprises:

normalizing each image content evaluation characteristic value into a corresponding preset normalization interval.

In an embodiment of the present invention, a method for extracting the proportion fc1 of the non-red pixel comprises:

converting the color preprocessed image for content evaluation from RGB space to HSV space to create an HSV image;

after taking an angle metric of an H channel corresponding to each pixel in the HSV image and performing normalization, determining whether the normalized angle metric of the H channel corresponding to the current pixel is in a preset red interval; if the normalized angle metric is in the preset red interval, marking the current pixel as 1, and if the normalized angle metric is not in the preset red interval, marking the current pixel as 0; and taking the ratio of the total number of pixels marked as 0 to the total number of pixels in the HSV image as the proportion fc1 of the non-red pixel.

In an embodiment of the present invention, the method further comprises:

adjusting the value of the proportion fc1 of the non-red pixel to 0 if it is less than a preset sixth value.

In an embodiment of the present invention, a method for extracting the proportion fc2 of the second overexposed pixel comprises:

carrying out a grayscale processing on the color preprocessed image for content evaluation to create a second grayscale image;

if the grayscale value of a pixel in the second grayscale image is in a preset second exposure grayscale value range, taking the current pixel as an overexposed pixel; and taking the ratio of the total number of overexposed pixels to the total number of pixels in the second grayscale image as the proportion fc2 of the second overexposed pixel.

In an embodiment of the present invention, the method further comprises:

adjusting the value of the proportion fc2 of the second overexposed pixel to 0 if the proportion fc2 statistically determined is less than a preset seventh value.

In an embodiment of the present invention, a method for extracting the proportion fc3 of the second dark pixel comprises:

carrying out a grayscale processing on the color preprocessed image for content evaluation to create a second grayscale image;

if the grayscale value of a pixel in the second grayscale image is in a preset second dark pixel value range, taking the current pixel as a dark pixel; and taking the ratio of the total number of dark pixels to the total number of pixels in the second grayscale image as the proportion fc3 of the second dark pixel.

In an embodiment of the present invention, the method further comprises:

adjusting the value of the proportion fc3 of the second dark pixels to 0 if the proportion fc3 of the second dark pixel is not greater than a preset eighth value.

In an embodiment of the present invention, a method for extracting the number fc4 of the dot impurities comprises:

carrying out a grayscale processing on the color preprocessed image for content evaluation to create a second grayscale image;

processing the second grayscale image using a filtering window that is a preset filtering template to form a window image;

binarizing the window image to obtain a binary image, wherein the dot impurities in the binary image are assigned a value of 1, and other regions are assigned a value of 0;

counting the number of pixels with the value 1 as the number fc4 of the dot impurities.

In an embodiment of the present invention, the method further comprises:

adjusting the value of the number fc4 of the dot impurities to N if the number fc4 of the dot impurities is greater than a preset ninth value, wherein the value range of N is [0, 30];

wherein the preset ninth value is calculated according to the values of each pixel of a R channel and a G channel in the color preprocessed image for content evaluation;

the preset ninth value thre=mean (Ir)-mean (Ig), wherein mean represents a mean value, Ir is the value of each pixel in the R channel, and Ig is the value of each pixel in the G channel.

In an embodiment of the present invention, a method for extracting the color characteristic comprises:

converting the color preprocessed image for content evaluation from RGB space to HSV space to create an HSV image;

obtaining the values of a R channel and a G channel in the color preprocessed image for content evaluation, and obtaining the value of an S channel in the HSV image;

then, fc5=mean(Ir)−mean(Ig), fc6=(mean(Ir))/(mean(Ig)), fc7=(mean(Ir))/(mean(Is));

wherein, mean represents the mean value, Ir is the value of each pixel in the R channel, Ig is the value of each pixel in the G channel, and Is is the value of each pixel in the S channel.

In an embodiment of the present invention, before constructing the image quality evaluation model and the image content evaluation model, the method further comprises:

performing initial scoring on m original images using n groups of rules to generate m*n groups of evaluation scores;

standardizing the m*n groups of evaluation scores to obtain m*n groups of standard scores $x_{mn}'$;

$x_{mn}'=(x_{mn}-\mu_m)/\sigma_m$, wherein, $x_{mn}$ represents an initial score of any original image calculated by any rule; $\mu_m$ represents a mean value of m initial scores obtained from m original images according to rules corresponding to $x_{mn}$;

$\sigma_m$ represents a variance of m initial scores obtained from m original images according to the rules corresponding to $x_{mn}$;

eliminating abnormal standard scores from the m*n groups of evaluation scores while keeping effective standard scores; wherein if $(x_{mn}'-\mu_n)/\sigma_n$>score, score≥$\mu_n-3\sigma_n$, the current standard score is determined as an abnormal value; if $(x_{mn}'-\mu_n)/\sigma_n$≥score, the current standard score is determined as an effective value;

where, $\mu_n$ represents a mean value of n initial scores obtained from the original images corresponding to $x_{mn}'$ using n groups of rules; $\sigma_n$ represents a variance of n initial scores obtained from the original images corresponding to $x_{mn}'$ using n groups of rules;

taking a mean value, a median value or a weighted value of the effective standard scores corresponding to each original image as an evaluation score of the current original image, wherein the evaluation score comprises an image quality calculation score or an image content calculation score.

In order to achieve one of the above-mentioned objects of the present invention, an embodiment of the present invention provides an electronic device, comprising a memory and a processor, wherein the memory stores a computer program that can run on the processor, and the processor executes the program to implement the steps of the referenceless image evaluation method for a capsule endoscope. The referenceless image evaluation method for the capsule endoscope comprises:

inputting original images into a preset image quality evaluation model and a preset image content evaluation model, to acquire image quality evaluation scores and image content evaluation scores corresponding to the original images; and determining, according to weight values of the image content evaluation scores and weight values of the image quality evaluation scores, a comprehensive score for each image currently being evaluated, wherein a weighting coefficient value corresponding to the weighted value is determined according to the weight of the image quality evaluation score.

In order to achieve one of the above-mentioned objects of the present invention, an embodiment of the present invention provides a computer-readable storage medium for storing a computer program, wherein the computer program is executed by the processor to implement the steps of the referenceless image evaluation method for a capsule endoscope. The referenceless image evaluation method for the capsule endoscope comprises:

inputting original images into a preset image quality evaluation model and a preset image content evaluation model, to acquire image quality evaluation scores and image content evaluation scores corresponding to the original images; and determining, according to weight values of the image content evaluation scores and weight values of the image quality evaluation scores, a comprehensive score for each image currently being evaluated, wherein a weighting coefficient value corresponding to the weighted value is determined according to the weight of the image quality evaluation score.

According to all aspects of the present invention, the referenceless image evaluation method for a capsule endoscope e, the electronic device, and the medium of the present invention employs various evaluation models to evaluate the image quality and image content of a number of original images taken in the same detection region. The results of these evaluations are then combined to produce comprehensive scores for the numerous original images of the same region. Through the comprehensive scores, high-quality images can be quickly screened out, and thus the screening of the original images can be accelerated and the identification accuracy can be improved.

BRIEF DESCRIPTION OF THE DRAWINGS

FIG. 1 is an exemplar process flow diagram of a referenceless image evaluation method for a capsule endoscope, in accordance with a first embodiment of the present invention.

FIG. 2 is an exemplar process flow diagram of a selection process of model base data for generating comprehensive scores in FIG. 1.

FIG. 3 is an exemplar process flow diagram of a method for constructing an image quality evaluation model used in FIG. 1.

FIG. 4 is an exemplar process flow diagram of a first preferred embodiment for implementing step M1 in FIG. 3.

FIG. 7 is an exemplar process flow diagram of a method for constructing an image content evaluation model used in FIG. 1.

FIG. 8 is an exemplar process flow diagram of a first preferred embodiment for implementing step N1 in FIG. 7.

DETAILED DESCRIPTION

Figures 5, 6:
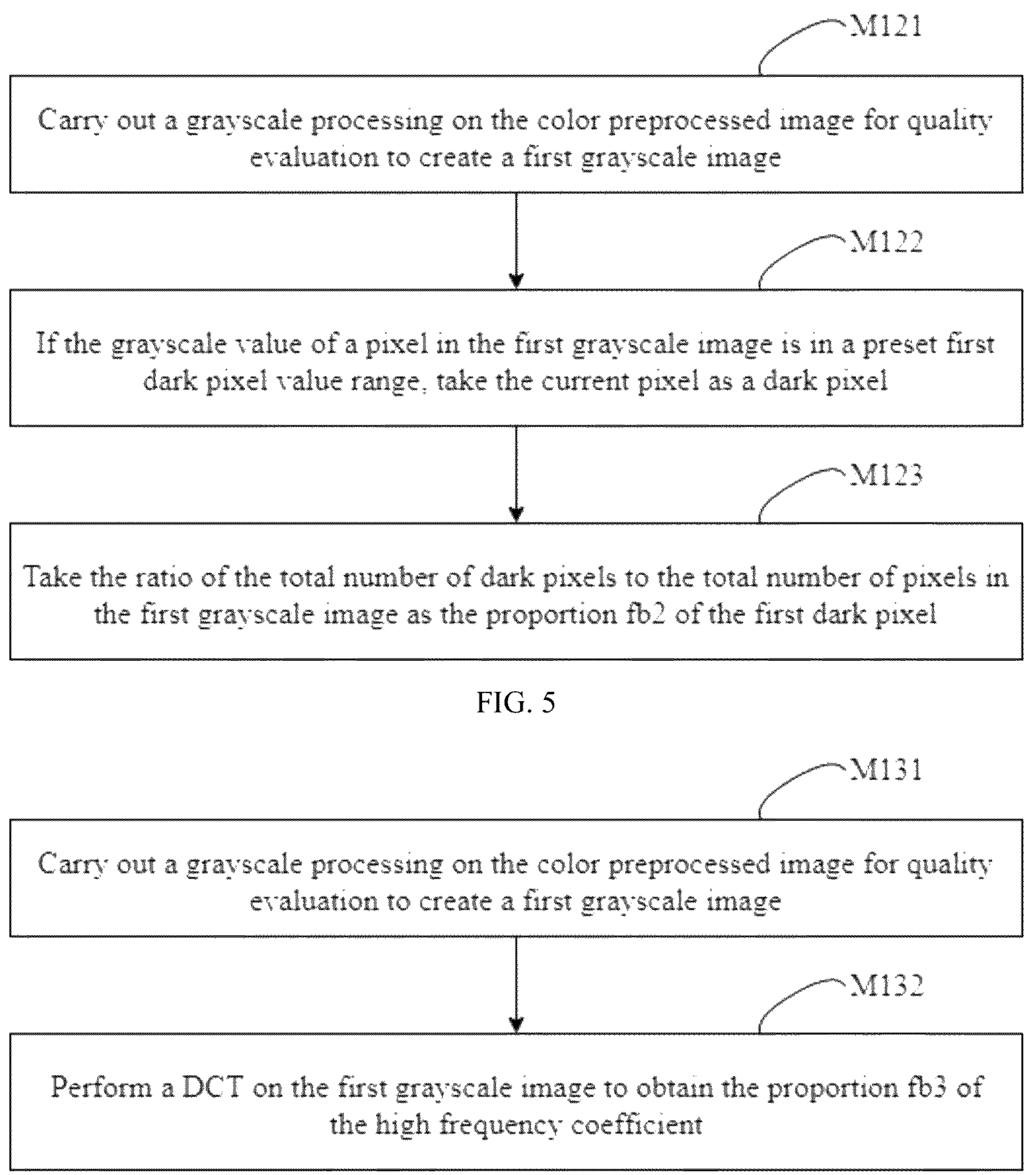
FIG. 5 is an exemplar process flow diagram of a second preferred embodiment for implementing step M1 in FIG. 3.
FIG. 6 is an exemplar process flow diagram of a third preferred embodiment for implementing step M1 in FIG. 3

The present invention can be described in detail below with reference to the accompanying drawings and preferred embodiments. However, the embodiments are not intended to limit the present invention, and the structural, method, or functional changes made by those skilled in the art in accordance with the embodiments are included in the scope of the present invention.

Referring to FIG. 1, a first embodiment of the present invention provides a referenceless image evaluation method for a capsule endoscope. The method comprises:

- inputting original images into a preset image quality evaluation model and a preset image content evaluation model, so as to acquire image quality evaluation scores and image content evaluation scores corresponding to the original images; and determining, according to weight values of the image content evaluation scores and weight values of the image quality evaluation scores, a comprehensive score for each image currently being evaluated; where a weighting coefficient value corresponding to the weighted value is determined according to the weight of the image quality evaluation score.

In an embodiment of the present invention, the comprehensive score of the original image is calculated by using two types of image scores, which are an image quality evaluation score and an image content evaluation score. In the present invention, the image quality evaluation score is defined as an objective evaluation for the distortion degree of a digestive tract image, including noise, blur, etc., so as to objectively give different scores for different degrees of distortion. The image content evaluation score is defined as an objective evaluation for effective contents of the digestive tract image, so as to assist in screening out some images with poor cleanliness.

In a preferred embodiment of the present invention, if the image content evaluation score is not greater than a preset first value, or the image content evaluation score is not less than a preset third value, and the image quality evaluation score is not greater than a preset second value, the image content evaluation score is taken as the comprehensive score of the current original image, that is, the weighting coefficient value of the image content evaluation score is assigned a value of 1, and the weighting coefficient value of the image quality evaluation score is assigned a value of 0. If the image content evaluation score is greater than the preset third value and the image quality evaluation score is greater than the preset second value, the image quality evaluation score is taken as the comprehensive score of the current original image, that is, the weighting coefficient value of the image content evaluation score is assigned a value of 0, and the weighting coefficient value of the image quality evaluation score is assigned a value of 1. If the image content evaluation score is between the preset first value and the preset third value, the weighted value is specifically set according to the actual situation, where the preset first value is less than the preset second value and the preset second value is less than the preset third value.

In a specific embodiment of the present invention, the total scores corresponding to the image quality evaluation score and the image content evaluation score are both set to 5 points, the preset first value is set to 2.2 points, the preset second value is set to 3 points, and the preset third value is set to 3.8 points. predict_score is defined to represent the comprehensive score, content_score is defined to represent the image content evaluation score, quality_score is defined to represent the image quality evaluation score, and ω is defined to represent the weighted value. In this specific embodiment, ω is specifically the weighting coefficient value of the image quality evaluation score, (1−ω) represents the weighting coefficient value of the image content evaluation score, and the value of ω may be 0.4. Then, the comprehensive score predict_score is expressed by the formula as follows:

$$\text{predict\_score} = \begin{cases} \text{content\_score}, & \text{content\_score} \le 2.2 \\ \text{content\_score}, & \text{content\_score} \ge 3.8,\ \text{quality\_score} \le 3 \\ \text{quality\_score}, & \text{content\_score} > 3.8,\ \text{quality\_score} > 3 \\ \omega \times \text{quality\_score} + (1-\omega) \times \text{content\_score}, & \text{else} \end{cases}.$$

In an embodiment of the present invention, after the original images are input into a preset image quality evaluation model and a preset image content evaluation model, the image quality evaluation scores and the image content evaluation scores are automatically generated.

Preferably, before inputting the original images into the image quality evaluation model and the image content evaluation model, the method further comprises: selecting basic data for constructing the image quality evaluation model and the image content evaluation model.

Referring to FIG. 2, in a preferred embodiment of the present invention, the steps of selecting the basic data specifically comprises: step S1, performing initial scoring on m original images using n groups of rules to generate m*n groups of evaluation scores;

- step S2, standardizing the m*n groups of evaluation scores to obtain m*n groups of standard scores $x_{mn}'$;
- where $x_{mn}'$ meets: $x_{mn}'=(x_{mn}-\mu_m)/\sigma_m$;
- where, $x_{mn}$ represents an initial score of any original image calculated by any rule, $\mu_m$ represents a mean value of m initial scores obtained from m original images according to the rules corresponding to $x_{mn}$, and $\sigma_m$ represents a variance of m initial scores obtained from m original images according to the rules corresponding to $x_{mn}$;
- step S3, eliminating abnormal standard scores from the m*n groups of evaluation scores while keeping effective standard scores;

if $(x_{mn}'-\mu_n)/\sigma_n$>score and score≥$\mu_n-3\sigma_n$, the current standard score is determined as an abnormal standard score; if $(x_{mn}'-\mu_n)/\sigma_n$≤score, the current standard score is determined as an effective standard score; where $\mu_n$ represents a mean value of n initial scores obtained from the original images corresponding to $x_{mn}'$ using n groups of rules, $\sigma_n$ represents a variance of n initial scores obtained from the original images corresponding to $x_{mn}'$ using n groups of rules, and score is a preset score threshold;

step S4, taking a mean value, a median value or a weighted value of the effective standard scores corresponding to each original image as an evaluation score of the current original image, where the evaluation score comprises an image quality calculation score or an image content calculation score.

In an embodiment of the present invention, in step S1, the m original images may be initially scored with human assistance, that is, n groups of rules are implemented by n observers through subjective observation; accordingly, the n observers respectively perform scoring to obtain the image quality calculation scores and the image content calculation scores for m original images, and the scores given by the n observers corresponding to the original images are the initial scores thereof.

It should be noted that the image quality calculation scores and the image quality evaluation scores are both numerical values of the same sort, and the image content calculation scores and the image content evaluation scores are also both numerical values of the same sort. The differences are as follows: the image quality calculation scores and the image content calculation scores are numerical values that are obtained through scoring of the original images in accordance with the rules and processing the scores in steps S1-S4 before the models are constructed; the image quality evaluation scores and image content evaluation scores are numerical values that are obtained by inputting the original images into the models and scoring directly by the models after the models are constructed. To make the present invention easier to understand, they are distinguished here in two nomenclature forms and won't be further described here.

As for step S2, in this specific embodiment, standardizing refers to a standardized processing applied to the score given by each observer. Here, for the formula of step S2, each observer views m original images respectively to give m initial scores corresponding to the m original images, and in the formula, Um represents the mean value of the initial scores for the group, and Om represents the variance of the initial scores for the group.

As for step S3, in this specific embodiment, the object is to eliminate outliers in the scores given by the observer through subjective observation. Here, for the formula of step S3, each of the n observers gives an initial score corresponding to any original image, and in the formula, Un represents the mean value of the initial scores for the group; On represents the variance of the initial scores for the group.

Further, the images captured by a capsule endoscope are imaged in a unique manner, and the convex lens of the camera easily contributes to a barrel distortion of the images. In a preferred embodiment of the present invention, before the image quality evaluation model and the image content evaluation model are constructed, in order to reduce the influence of distortion on image stitching, the method further comprises: clipping an original image at a preset size [W, H] with the center of the original image as the center point to obtain a preprocessed image; where WE [¼*M, ⅚*M] and HE [¼*N, ⅚*N], [M, N] represent the size of the original image, M and N respectively represent the length and width of the original image, [W, H] represent the size of the preprocessed image, W and H respectively represent the length and width of the preprocessed image. The preprocessed image comprises: a preprocessed image for quality evaluation and a preprocessed image for content evaluation.

Preferably, when constructing the image quality evaluation model and the image content evaluation model, the images used are preprocessed images, and the scoring data used are scores obtained after performing the steps S1-S4 and processing the original scores.

It should be noted that, in the following description of the present invention, the image quality evaluation model and the image content evaluation model are respectively constructed according to the obtained preprocessed images for quality evaluation and the corresponding image quality calculation scores, and the obtained preprocessed images for content evaluation and the corresponding image content calculation scores. Alternatively, in other embodiments of the present invention, both the image quality evaluation model and the image content evaluation model may be constructed according to the original images and the corresponding scores.

Referring to FIG. 3, preferably, in an embodiment of the present invention, a method for constructing the image quality evaluation model comprises:

step M1, analyzing each preprocessed image for quality evaluation to extract a corresponding image quality evaluation characteristic value, where the image quality evaluation characteristic value comprises: at least one of a proportion fb1 of a first overexposed pixel, a proportion fb2 of a first dark pixel, a proportion fb3 of a high-frequency coefficient, and a characteristic value $f_{bri}$ obtained by a BRISQUE (Blind/Referenceless Image Spatial Quality Evaluator) algorithm; step M2, dividing the preprocessed images for quality evaluation into a first training set and a first testing set according to a predetermined ratio, training data of the first training set by using a support vector machine (SVM), and verifying by using data of the first testing set to obtain the image quality evaluation model; where, both the data of the first training set and the data of the first testing set comprise image quality calculation scores and image quality evaluation characteristic values corresponding to the preprocessed images for quality evaluation.

Preferably, referring to FIG. 4, in the step M1, a method for extracting the proportion fb1 of the first overexposed pixel comprises: step M111, carrying out a grayscale processing on the color preprocessed image for quality evaluation to create a first grayscale image; step M112, if the grayscale value of a pixel in the first grayscale image is in a preset first exposure grayscale value range, taking the current pixel as an overexposed pixel; step M113, taking the ratio of the total number of overexposed pixels to the total number of pixels in the first grayscale image as the proportion fb1 of the first overexposed pixel.

In a specific example of the present invention, the size of the preset first exposure grayscale value range can be adjusted as required. For example, the range may be set to [200, 255], preferably to [210, 255]. In a specific example of the present invention, the preset first exposure grayscale value range is set to [235, 254].

Further, after the step M113, the method further comprises: adjusting the value of the proportion fb1 of the first overexposed pixels to 0 if the proportion fb1 of the first overexposed pixel is less than a preset fourth value. By doing this, the effect of a few pixels on the calculation result is eliminated, and the calculation accuracy is improved.

In an embodiment of the present invention, the preset fourth value can be set as required. In a specific example of the present invention, the preset fourth value is set to 0.01. In this case, the value of fb1 can be expressed as:

$$fb1=\begin{cases}0, & fb1<0.01\\ fb1, & \text{else}\end{cases}.$$

Preferably, referring to FIG. 5, in the step M1, a method for extracting the proportion fb2 of the first dark pixel comprises: step M121, carrying out a grayscale processing on the color preprocessed image for quality evaluation to create a first grayscale image; step M122, if the grayscale value of a pixel in the first grayscale image is in a preset first dark pixel value range, taking the current pixel as a dark pixel; step M123, taking the ratio of the total number of dark pixels to the total number of pixels in the first grayscale image as the proportion fb2 of the first dark pixel.

In a specific example of the present invention, the size of the first dark pixel range can be adjusted as required. For example, the range may be set to [0, 120], preferably to [60, 120]. In a specific example of the present invention, the first dark pixel range is set to [60, 77].

Further, after the step M123, the method further comprises: adjusting the value of the proportion fb2 of the first dark pixel to 0 if the proportion fb2 of the first dark pixel is not greater than a preset fifth value. By doing this, the effect of a few pixels on the calculation result is eliminated, and the calculation accuracy is improved.

In an embodiment of the present invention, the preset fifth value can be set as required. In a specific example of the present invention, the preset fifth value is set to 0.2. The value of fb2 can be expressed as:

$$fb2=\begin{cases}0, & fb2, \leq 0.2\\ fb2, & \text{else}\end{cases}.$$

Preferably, referring to FIG. 6, in the step M1, a method for extracting the proportion fb3 of the high frequency coefficient comprises: step M131, carrying out a grayscale processing on the color preprocessed image for quality evaluation to create a first grayscale image; step M132, performing a DCT (Discrete Cosine Transform) on the first grayscale image to obtain the proportion fb3 of the high frequency coefficient, i.e.:

fb3=length(Y<m), Y=ln(|dct(I_gray, block)|);

where, I_gray represents the first grayscale image, dct(I_gray, block) represents performing a two-dimensional DCT on the first gray image I_gray with a size of block;

block=[WD, HD], which represents the block size of the first grayscale image, where WD, HD∈[2, 2^2, 2^3, . . . , 2^n] on the premise of not exceeding the size of the first grayscale image, and WD, HD are the length and width of the block of the first grayscale image, respectively;

ln represents a natural logarithm transformation with e as the base; and length(Y<m) represents the number less than m in the statistic Y, and the value range of m is [−10, 0].

In a specific example of the present invention, the block size of the first grayscale image is 64*64, that is, WD=HD=64. Preferably, the value of m is −4.

It should be noted that the DCT is a transform related to the Fourier transform. DCT is mainly used to distinguish the high and low frequency components in the image. After DCT, large coefficients are concentrated in the upper left corner, representing low frequency components of the image, while the lower right corner is almost 0, representing high frequency components of the image. The low frequency coefficients represent the contour and grayscale distribution of an object in the image, and the high frequency coefficients represent the edge, detail and noise of the image. In an embodiment of the present invention, in order to represent the noise amplitude of the image, a block DCT is performed on the image. The closer the transformed coefficient is to 0, the less noise is at the pixel position, and the larger the fb3, the less noise interference is in the image.

Preferably, in the step M1, a method for obtaining the characteristic value $f_{bri}$ by a BRISQUE algorithm comprises: step M141, carrying out a grayscale processing on the color preprocessed image for quality evaluation to create a first grayscale image; step M142, calculating a Mean Subtracted Contrast Normalized (MSCN) coefficient of the first grayscale image; step M143, fitting the obtained MSCN coefficient into a Generalized Gaussian Distribution (GGD); step M144, fitting the product of adjacent coefficients of the MSCN into an Asymmetric Generalized Gaussian Distribution (AGGD) in four directions, to obtain an AGGD parameter $$(\alpha, \sigma_l^2, \sigma_r^2, \eta)$$

in each direction, where a 16-dimensional characteristic $f_{AGGD}$ of BRISQUE can be obtained by combining the AGGD parameters in 4 directions; step M145, performing a downsampling on the first grayscale image by a factor of 2, and extracting a 2-dimensional $f_{GGD2}$ and a 16-dimensional $f_{AGGD2}$ again on the downsampled image, to finally obtain a $f_{bri}=[f_{GGD}, f_{AGGD}, f_{GGD2}, f_{AGGD2}]$, totaling 36 dimensions.

For the step M142, the calculation process is expressed by the formulas as follows:

$$\hat{I}(i,j)=\frac{I(i,j)-\mu(i,j)}{\sigma(i,j)+C};$$

$$\mu(i,j)=\sum_{k=-K}^{K}\sum_{l=-L}^{L}W_{k,l}I_{k,l}(i,j);$$

$$\sigma(i,j)=\sqrt{\sum_{k=-K}^{K}\sum_{l=-L}^{L}W_{k,l}(I_{k,l}(i,j)-\mu(i,j))^2}.$$

where, Î(i, j) represents the MSCN coefficient, and the MSCN coefficient is specifically a 1-dimensional vector obtained after expansion of Î(i, j); I(i,j) represents the pixel value of the first grayscale image, and (i, j) represents the pixel coordinate value of the first grayscale image; C is a constant greater than 0, and is set to prevent the denominator from being 0; μ(i, j) represents a local mean value in a window and σ(i, j) represents a local variance in a window; $W=\{W_{k,l}|k=-K, \ldots K, l=-L, \ldots L\}$ is a two-dimensional Gaussian window, K and L are the length and width of the Gaussian window, and $I_{k,l}(i, j)$ represents the pixel value of the grayscale image in the window.

In an implementable example of the present invention, K=L={2, 3, 4, 5}, and in a preferred example of the present invention, K=L=3 and C=1.

For the step M143, the calculation process is expressed by the formulas as follows:

$$f(x;\alpha,\sigma^2)=\frac{\alpha}{2\beta\Gamma(1/\alpha)}\exp\left(-\left(\frac{|x|}{\beta}\right)^{\alpha}\right);$$

$$\beta=\alpha\sqrt{\frac{\Gamma(1/a)}{\Gamma(3/\alpha)}};$$

$$\Gamma(a)=\int_0^{\infty}t^{a-1}e^{-t}dta>0.$$

where, x represents the MSCN coefficient to be fitted, i.e., represents the Î(i, j) in step M142; α, $\sigma^2$ represents the parameter obtained according to model fitting; Γ represents a Gamma function.

For the step M144, the calculation process is expressed by the formulas as follows:

$$f_x(y;\alpha,\sigma_l^2,\sigma_r^2)=\begin{cases}\frac{\alpha}{(\beta_l+\beta_r)\Gamma(1/\alpha)}\exp\left(-\left(\frac{-(x)}{\beta_l}\right)^{\alpha}\right), & x<0\\ \frac{\alpha}{(\beta_l+\beta_r)\Gamma(1/a)}\exp\left(-\left(\frac{x}{\beta_r}\right)^{\alpha}\right), & x\geq 0\end{cases};$$

$$\eta=(\beta_r-\beta_l)\frac{\Gamma(2/\alpha)}{\Gamma(1/\alpha)},\quad \beta_r=\sigma_r\sqrt{\frac{\Gamma(1/\alpha)}{\Gamma(3/\alpha)}},\quad \beta_l=\sigma_l\sqrt{\frac{\Gamma(1/\alpha)}{\Gamma(3/\alpha)}}.$$

where, y represents the product of two adjacent MSCN coefficients to be fitted corresponding to each direction, which specifically represents the equations corresponding to the following four directions, and $$(\alpha,\sigma_l^2,\sigma_r^2,\eta)$$

represents the AGGD parameter.

Further, the four directions respectively refer to a horizontal direction H(i,j), a vertical direction V(i,j), a principal diagonal direction D1(i,j), and a secondary diagonal direction D2(i,j):

H(i,j)=Î(i,j)Î(i,j+1),

V(i,j)=Î(i,j) Î(i+1,j),

D1(i,j)=Î(i,j) Î(i+1,j+1),

D2(i,j)=Î(i,j) Î(i+1,j−1).

For the step M145, the downsampling may be performed by using a nearest neighbor interpolation method.

Preferably, in order to highlight the proportion of the image quality evaluation characteristic value corresponding to each sample (preprocessed image for quality evaluation) in the training set, between the step M1 and the step M2, the method further comprises: normalizing each image quality evaluation characteristic value to a corresponding preset normalization interval, for example: [−1, 1]; preferably, a max-min normalization algorithm may be used for the normalization process.

For the step M2, the ratio of the first training set to the first testing set may be specifically set as required. In a specific example of the present invention, for example: in the training process, 80% of the original data set is used as the first training set, and the rest as the first testing set, and data in the training set is trained based on a libSVM library to obtain the image quality evaluation model. The libSVM library is an open source library based on SVM.

Preferably, referring to FIG. 7, in an embodiment of the present invention, a method for constructing the image content evaluation model comprises: step N1, analyzing each preprocessed image for content evaluation to extract a corresponding image content evaluation characteristic value, where the image content evaluation characteristic value comprises: at least one of a proportion fc1 of a non-red pixel, a proportion fc2 of a second overexposed pixel, a proportion fc3 of a second dark pixel, a number fc4 of dot impurities, and a color characteristic, where the color characteristic comprises at least one of a first color characteristic fc5, a second color characteristic fc6, and a third color characteristic fc7; step N2, dividing the preprocessed images for content evaluation into a second training set and a second testing set according to a predetermined ratio, training data of the second training set by using a support vector machine, and verifying by using data of the second testing set to obtain an image content evaluation model; where, both the data of the second training set and the data of the second testing set comprise image quality calculation scores and image content evaluation characteristic values corresponding to the preprocessed images for content evaluation.

Preferably, referring to FIG. 8, in the step N1, a method for extracting the proportion fc1 of the non-red pixel comprises: step N111, converting the color preprocessed image for content evaluation from RGB space to HSV space to create an HSV image; step N112, after taking an angle metric of an H channel corresponding to each pixel in the HSV image and performing normalization, determining whether the normalized angle metric of the H channel corresponding to the current pixel is in a preset red interval; if the normalized angle metric is in the preset red interval, marking the current pixel as 1, and if the normalized angle metric is not in the preset red interval, marking the current pixel as 0; step N113, taking the ratio of the total number of pixels marked as 0 to the total number of pixels in the HSV image as the proportion fc1 of the non-red pixel.

In a specific example of the present invention, the size of the preset red interval range can be specifically adjusted as required, for example: the range may be set to [0, fc11] and [fc22, 1], where, fc11∈[0.90,0.99], fc22∈[0.01,0.1]. In a specific example of the present invention, the value of fc11 is set to 0.975 and the value of fc22 is set to 0.06.

Further, after step N113, the method further comprises: adjusting the value of the proportion fc1 of the non-red pixel to 0 if it is less than a preset sixth value. By doing this, the effect of a few pixels on the calculation result is eliminated, and certain non-red pixels are allowed to exist, so that the calculation accuracy is improved.

In an embodiment of the present invention, the preset sixth value can be set as required. In a specific example of the present invention, the preset sixth value is set to 0.05. The value of fc1 can be expressed in the formula as follows:

$$fc1=\begin{cases}0, & fc1<0.05\\ fc1, & \text{else}\end{cases}.$$

Figures 9, 10:
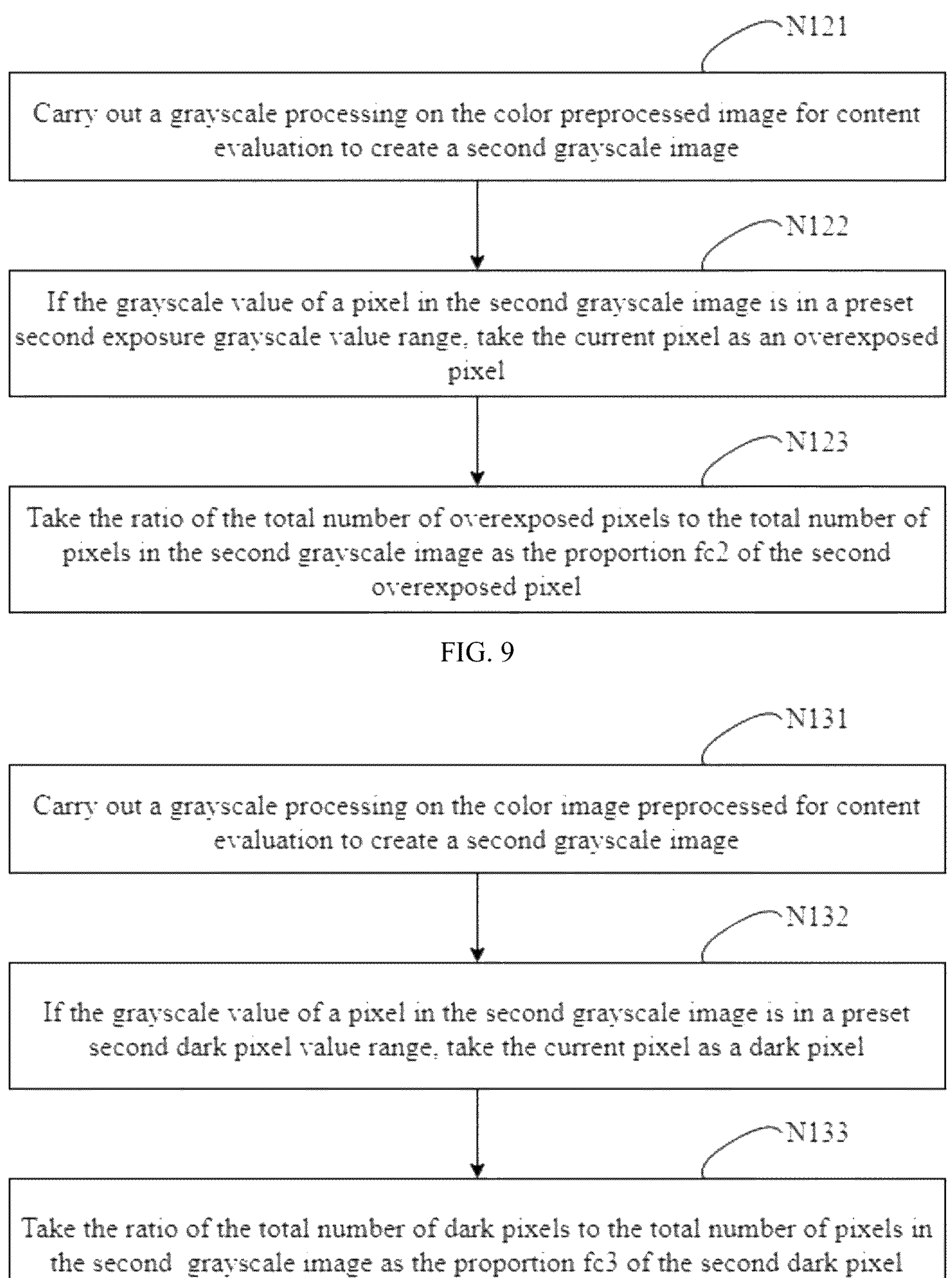
FIG. 9 is an exemplar process flow diagram of a second preferred embodiment for implementing step N1 in FIG. 7.
FIG. 10 is an exemplar process flow diagram of a third preferred embodiment for implementing step N1 in FIG. 7.

Preferably, referring to FIG. 9, in the step N1, a method for extracting the proportion fc2 of the second overexposed pixel comprises: step N121, carrying out a grayscale processing on the color preprocessed image for content evaluation to create a second grayscale image; step N122, if the grayscale value of a pixel in the second grayscale image is in a preset second exposure grayscale value range, taking the current pixel as an overexposed pixel; step N123, taking the ratio of the total number of overexposed pixels to the total number of pixels in the second grayscale image as the proportion fc2 of the second overexposed pixel.

In a specific example of the present invention, the size of the preset second exposure grayscale value range can be adjusted as required. For example, the range may be set to [200, 255], preferably to [210, 255]. In a specific example of the present invention, the second exposure grayscale value range is set to [235, 254].

Further, after the step N123, the method further comprises: adjusting the value of the proportion fc2 of the second overexposed pixel to 0 if the proportion fc2 statistically determined is less than a preset seventh value. By doing this, the effect of a few pixels on the calculation result is eliminated, and the calculation accuracy is improved.

In an embodiment of the present invention, the preset seventh value can be set as required. In a specific example of the present invention, the preset seventh value is set to 0.01. The value of fc1 can be expressed in the formula as follows:

$$fc1 = \begin{cases} 0, & fc1 < 0.01 \\ fc1, & \text{else} \end{cases}.$$

Preferably, referring to FIG. 10, in the step N1, a method for extracting the proportion fc3 of the second dark pixel comprises: step N131, carrying out a grayscale processing on the color image preprocessed for content evaluation to create a second grayscale image; step N132, if the grayscale value of a pixel in the second grayscale image is in a preset second dark pixel value range, taking the current pixel as a dark pixel; step N133, taking the ratio of the total number of dark pixels to the total number of pixels in the second grayscale image as the proportion fc3 of the second dark pixel.

In a specific example of the present invention, the size of the a preset second dark pixel range can be adjusted as required. For example, the range may be set to [0, 120], preferably to [60, 120]. In a specific example of the present invention, the preset second dark pixel range is set to [60, 100].

Further, after the step N133, the method further comprises: adjusting the value of the proportion fc3 of the second dark pixels to 0 if the proportion fc3 of the second dark pixel is not greater than a preset eighth value. By doing this, the effect of a few pixels on the calculation result is eliminated, and the calculation accuracy is improved.

In an embodiment of the present invention, the preset eighth value can be set as required. In a specific example of the present invention, the preset eighth value is set to 0.3. The value of fb3 can be expressed in the formula as follows:

$$fc3 = \begin{cases} 0, & fc3 \le 0.3 \\ fc3, & \text{else} \end{cases}.$$

Figure 11:
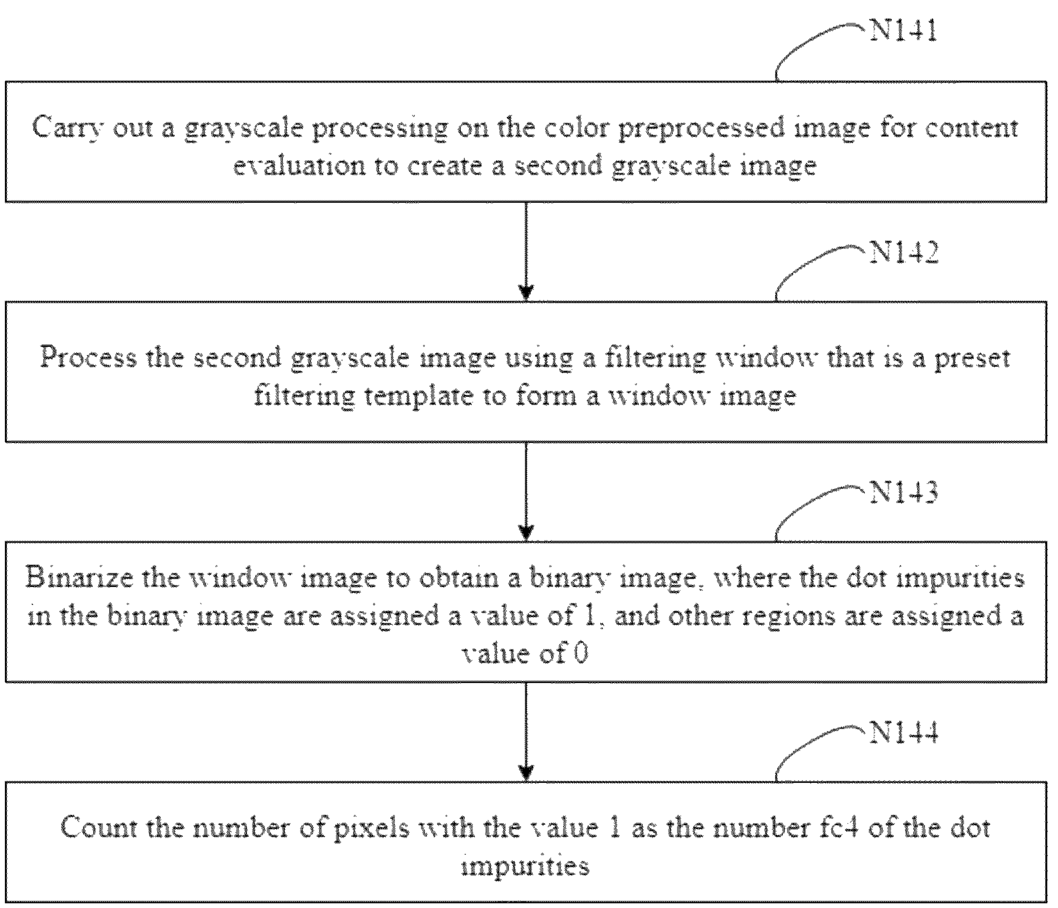
FIG. 11 is an exemplar process flow diagram of a fourth preferred embodiment for implementing step N1 in FIG. 7.
Figure 12:
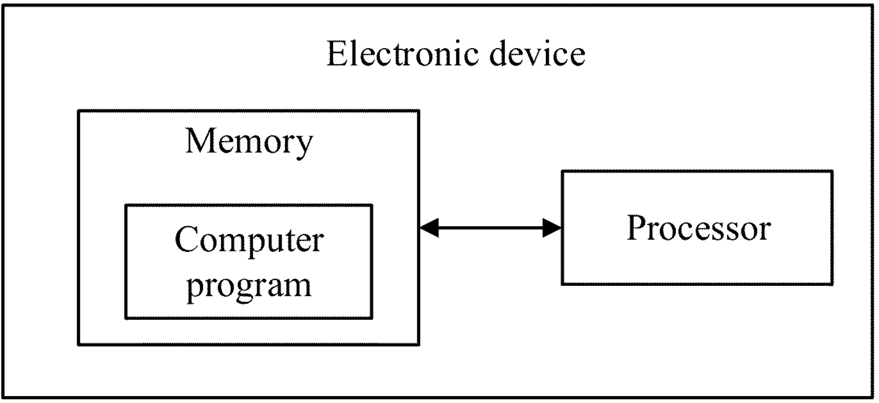
FIG. 12 is a schematic diagram of components of an exemplary electronic device in accordance with the present invention.

Preferably, referring to FIG. 11, in the step N1, in a digestive tract image, impurities such as mucus are often radially distributed in the field of view, which has nothing to do with the image capture quality but affects the acquisition of effective content information. The effect of dot impurities on image content can be measured by extracting the number of dot impurities. Specifically, a method for extracting the number fc4 of the dot impurities comprises: step N141, carrying out a grayscale processing on the color preprocessed image for content evaluation to create a second grayscale image; step N142, processing the second grayscale image using a filtering window that is a preset filtering template to form a window image; step N143, binarizing the window image to obtain a binary image, where the dot impurities in the binary image are assigned a value of 1, and other regions are assigned a value of 0; step N144, counting the number of pixels with the value 1 as the number fc4 of the dot impurities.

It should be noted that, in the step N142, the filtering template may be self-defined, and the window size and value thereof may be self-defined according to a specific application range. In a specific example of that present invention, for example: a filtering template is defined as $$\text{tplate} = \begin{bmatrix} -1, & -1, & -1 \\ -1, & 8, & -1 \\ -1, & -1, & -1 \end{bmatrix}.$$

Further, after the step N144, the method further comprises: adjusting the value of the number fc4 of the dot impurities to N if the number fc4 of the dot impurities is greater than a preset ninth value, wherein the value range of N is [0, 30]. By doing this, bubbles or reflective spots in a water image (the image taken by the capsule endoscope on water) are prevented from being regarded as impurities.

Preferably, the preset ninth value is calculated according to the values of each pixel of a R channel and a G channel in the color preprocessed image for content evaluation. The preset ninth value may be expressed as: thre=mean(Ir)−mean(Ig), where mean represents a mean value, Ir is the value of each pixel in the R channel, and Ig is the value of each pixel in the G channel.

Expressed in a formula, the value of fc4 can be expressed as:

$$fc4 = \begin{cases} N, & fc4 > thre \\ fc4, & \text{else} \end{cases}.$$

Preferably, in the step N1, a method for extracting the color characteristic comprises: step N151, converting the color preprocessed image for content evaluation from RGB space to HSV space to create an HSV image; step N152, obtaining the values of the R channel and the G channel in the color preprocessed image for content evaluation, respectively, and obtaining the value of an S channel in the HSV image;

then, fc5=mean(Ir)−mean(Ig), fc6=(mean(Ir))/(mean(Ig)), fc7−(mean(Ir))/(mean(Is));

where, mean represents the mean value, Ir is the value of each pixel in the R channel, Ig is the value of each pixel in the G channel, and Is is the value of each pixel in the S channel.

Preferably, in order to highlight the proportion of the image content evaluation characteristic value corresponding to each sample (preprocessed image for content evaluation) in the training set, between the step M1 and the step M2, the method further comprises: normalizing each image content evaluation characteristic value to a corresponding preset normalization interval, for example: [−1, 1]; preferably, a max-min normalization algorithm may be used for the normalization process.

In the step N2, the ratio of the second training set to the second testing set may be specifically set as required. In the training process, 80% of the original data set is used as the second training set, and the rest as the second testing set, and data in the training set is trained based on a libSVM library to obtain the image content evaluation model.

Further, the present invention provides an electronic device. In an embodiment, the electronic device comprises a memory and a processor, where the memory stores a computer program that can run on the processor, and the processor executes the computer program to implement the steps of the referenceless image evaluation method for a capsule endoscope.

Further, the present invention provides a computer-readable storage medium. In an embodiment, the computer-readable storage medium stores a computer program and the computer program is executed by the processor to implement the steps of the referenceless image evaluation method for a capsule endoscope.

In summary, the referenceless image evaluation method for a capsule endoscope, the electronic device, and the medium of the present invention employs various evaluation models to evaluate the image quality and image content of a number of original images taken in the same detection region. The results of these evaluations are then combined to produce comprehensive scores for the numerous original images of the same region. Through the comprehensive scores, high-quality images can be quickly screened out, and thus the screening of the original images can be accelerated and the identification accuracy can be improved.

It should be understood that, although the description is described in terms of embodiments, not every embodiment merely comprises an independent technical solution. The description is described in this manner for clarity, and those skilled in the art should have the description as a whole, and the technical solutions in each embodiment may also be combined as appropriate to form other embodiments that can be understood by those skilled in the art.

The series of detailed descriptions set forth above are only specific descriptions of feasible embodiments of the present invention and are not intended to limit the scope of protection of the present invention. Equivalent embodiments or modifications made within the spirit of the present invention should be included within the protection scope of the present invention.

The invention claimed is:

1. A referenceless image evaluation method for a capsule endoscope, comprising:

inputting original images into a preset image quality evaluation model and a preset image content evaluation model, so as to acquire image quality evaluation scores and image content evaluation scores corresponding to the original images; and determining, according to weights of the image content evaluation scores and weights of the image quality evaluation scores, a comprehensive score for each image currently being evaluated;

wherein a method for constructing the image quality evaluation model comprises:

analyzing each of the original images to extract a corresponding image quality evaluation characteristic value, wherein the image quality evaluation characteristic value comprises:

at least one of a proportion fb1 of a first overexposed pixel, a proportion fb2 of a first dark pixel, a proportion fb3 of a high-frequency coefficient, and a characteristic value $f_{bri}$ obtained by a BRISQUE (Blind/Referenceless Image Spatial Quality Evaluator) algorithm; and dividing each of the original images into a first training set and a first testing set according to a predetermined ratio, training data of the first training set by using a support vector machine, and verifying by using data of the first testing set to obtain the image quality evaluation model, wherein, both the data of the first training set and the data of the first testing set comprise image quality calculation scores and image quality evaluation characteristic values corresponding to the original images;

wherein before analyzing each of the original image to extract the corresponding image quality evaluation characteristic value, the method further comprises:

clipping the original image at a preset size [W, H] with the center of the original image as a center point to obtain a preprocessed image for quality evaluation for the purpose of extracting the image quality evaluation characteristic value, and wherein, W∈[¼*M, ⅚*M], HE [¼*N, ⅚*N], [M, N] represent the size of the original image;

after analyzing the preprocessed image for quality evaluation to extract the corresponding image quality evaluation characteristic value, the method further comprises:

normalizing each of the image quality evaluation characteristic value into a corresponding preset normalization interval.

2. The referenceless image evaluation method of claim 1, wherein a method for extracting the proportion fb1 of a first overexposed pixel comprises:

carrying out a grayscale processing on a color preprocessed image for quality evaluation to create a first grayscale image;

if the grayscale value of a pixel in the first grayscale image is in a preset first exposure grayscale value range, taking the current pixel as an overexposed pixel; and taking a ratio of a total number of overexposed pixels to a total number of pixels in the first grayscale image as the proportion fb1 of the first overexposed pixels.

3. The referenceless image evaluation method of claim 2, wherein the method further comprises:

adjusting the value of the proportion fb1 of the first overexposed pixels to 0 if the proportion fb1 of the first overexposed pixels is smaller than a preset fourth value.

4. The referenceless image evaluation method of claim 1, wherein a method for extracting the proportion fb2 of a first dark pixel comprises:

carrying out a grayscale processing on a color preprocessed image for quality evaluation to create a first grayscale image;

if the grayscale value of a pixel in the first grayscale image is in a preset first dark pixel value range, taking a current pixel as a dark pixel; and taking a ratio of a total number of dark pixels to a total number of pixels in the first grayscale image as the proportion fb2 of the first dark pixels.

5. The referenceless image evaluation method of claim 4, wherein the method further comprises:

adjusting the value of the proportion fb2 of the first dark pixels to 0 if the proportion fb2 of the first dark pixels is not greater than a preset fifth value.

6. The referenceless image evaluation method of claim 1, wherein a method for extracting the proportion fb3 of a high frequency coefficient comprises:

carrying out a grayscale processing on a color preprocessed image for quality evaluation to create a first grayscale image;

performing a Discrete Cosine Transform (DCT) on the first grayscale image to obtain the proportion fb3 of the high frequency coefficient;

i.e. fb3=length (Y<m), Y=ln(|dct(I_gray, block)|);

where, I_gray represents the first grayscale image;

dct(I_gray, block) represents performing a two-dimensional DCT on the first grayscale image I_gray with a size of block;

block=[WD, HD] represents the block size of the first grayscale image, where WD, HD∈[2, 2^2, 2^3, . . . , 2^n] on the premise of not exceeding the size of the first grayscale image;

ln represents a natural logarithm transformation with e as the base; and length (Y<m) represents the number smaller than m in the statistic Y, and the value range of m is [−10, 0].

7. The referenceless image evaluation method of claim 1, wherein a method for constructing the image content evaluation model comprises:

analyzing each of the original images to extract a corresponding image content evaluation characteristic value, wherein the image content evaluation characteristic value comprises: at least one of a proportion fc1 of a non-red pixel, a proportion fc2 of a second overexposed pixel, a proportion fc3 of a second dark pixel, a number fc4 of dot impurities, and a color characteristic, wherein the color characteristic comprises at least one of a first color characteristic fc5, a second color characteristic fc6, and a third color characteristic fc7;

dividing each of the original images into a second training set and a second testing set according to a predetermined ratio, training data of the second training set by using a support vector machine, and verifying by using data of the second testing set to obtain the image content evaluation model;

wherein, both the data of the second training set and the data of the second testing set comprise the image quality calculation scores and the image content evaluation characteristic values corresponding to the original images.

8. The referenceless image evaluation method of claim 7, wherein before analyzing each of the original image to extract the corresponding image content evaluation characteristic value, the method further comprises:

clipping the original image at a preset size [W, H] with the center of the original image as a center point to obtain a preprocessed image for content evaluation for the purpose of extracting the image content evaluation characteristic value, and wherein, W∈[¼*M, ⅚*M], H∈[¼*N, ⅚*N], [M, N] represent the size of the original image;

after analyzing each preprocessed image for content evaluation to extract the corresponding image content evaluation characteristic value, the method further comprises:

normalizing each of the image content evaluation characteristic value into a corresponding preset normalization interval.

9. The referenceless image evaluation method of claim 8, wherein a method for extracting the proportion fc1 of a non-red pixel comprises:

converting a color preprocessed image for content evaluation from RGB space to HSV space to create an HSV image;

after taking an angle metric of an H channel corresponding to each pixel in the HSV image and performing normalization, determining whether the normalized angle metric of the H channel corresponding to a current pixel is in a preset red interval; if so, marking the current pixel as 1, and if not, marking the current pixel as 0; and taking a ratio of a total number of pixels marked as 0 to a total number of pixels in the HSV image as the proportion fc1 of non-red pixels.

10. The referenceless image evaluation method of claim 9, wherein the method further comprises:

adjusting the value of the proportion fc1 of non-red pixels to 0 if it is smaller than a preset sixth value.

11. The referenceless image evaluation method of claim 8, wherein a method for extracting the proportion fc2 of a second overexposed pixel comprises:

carrying out a grayscale processing on a color preprocessed image for content evaluation to create a second grayscale image;

if the grayscale value of a pixel in the second grayscale image is in a preset second exposure grayscale value range, taking the current pixel as an overexposed pixel; and taking a ratio of a total number of overexposed pixels to a total number of pixels in the second grayscale image as the proportion fc2 of the second overexposed pixels.

12. The referenceless image evaluation method of claim 11, wherein the method further comprises:

adjusting the value of the proportion fc2 of the second overexposed pixels to 0 if the proportion fc2 statistically determined is smaller than a preset seventh value.

13. The referenceless image evaluation method of claim 8, wherein a method for extracting the proportion fc3 comprises:

carrying out a grayscale processing on a color preprocessed image for content evaluation to create a second grayscale image;

if the grayscale value of a pixel in the second grayscale image is in a preset second dark pixel value range, taking a current pixel as a dark pixel; and taking a ratio of a total number of dark pixels to a total number of pixels in the second grayscale image as the proportion fc3 of the second dark pixels.

14. The referenceless image evaluation method of claim 13, wherein the method further comprises:

adjusting the value of the proportion fc3 of the second dark pixels to 0 if the proportion fc3 of the second dark pixels is not greater than a preset eighth value.

15. The referenceless image evaluation method of claim 8, wherein a method for extracting the number fc4 of dot impurities comprises:

carrying out a grayscale processing on a color preprocessed image for content evaluation to create a second grayscale image;

processing the second grayscale image using a filtering window that is a preset filtering template to form a window image;

binarizing the window image to obtain a binary image, wherein dot impurities in the binary image are assigned a value of 1, and other regions a value of 0;

counting the number of pixels with the value 1 as the number fc4 of the dot impurities.

16. The referenceless image evaluation method of claim 15, wherein the method further comprises:

adjusting the value of the number fc4 of the dot impurities to N if the number fc4 of the dot impurities is great than a preset ninth value, wherein the value range of Nis [0, 30];

and wherein the preset ninth value is calculated according to the values of each pixel of a R channel and a G channel in the color preprocessed image for content evaluation;

the preset ninth value thre=mean(Ir)−mean(Ig), where mean represents a mean value, Ir is the value of each pixel in the R channel, and Ig is the value of each pixel in the G channel.

17. The referenceless image evaluation method of claim 8, wherein a method for extracting the color characteristic comprises:

converting a color preprocessed image for content evaluation from RGB space to HSV space to create an HSV image;

obtaining the values of the R channel and the G channel in the color preprocessed image for content evaluation, and obtaining the value of an S channel in an HSV image;

then, fc5=mean(Ir)−mean(Ig), fc6−(mean(Ir))/(mean(Ig)), fc7=(mean (Ir))/(mean(Is));

wherein, mean represents the mean value, Ir is the value of each pixel in the R channel, Ig is the value of each pixel in the G channel, and Is is the value of each pixel in the S channel.

18. The referenceless image evaluation method of claim 1, wherein before constructing the image quality evaluation model and the image content evaluation model, the method further comprises:

performing initial scoring on the m original images using n groups of rules to generate m*n groups of evaluation scores;

standardizing the m*n groups of evaluation scores to obtain m*n groups of standard scores $x_{mn}'$;

$x_{mn}'=(x_{mn}-\mu_m)/\sigma_m$, where, $x_{mn}$ represents an initial score of any original image calculated by any rule; $\mu_m$ represents a mean value of m initial scores obtained from m original images according to the rules corresponding to $x_{mn}$;

$\sigma_m$ represents a variance of m initial scores obtained from m original images according to the rules corresponding to x mn;

eliminating abnormal standard scores from the m*n groups of evaluation scores while keeping effective standard scores; wherein if $(x_{mn}'-\mu_n)/\sigma_n$>score, score≥$\mu_n-3\sigma_n$, the current standard score is determined as an abnormal value; if $(x_{mn}'-\mu_n)/\sigma_n$≤score, the current standard score is determined as an effective value;

where, $\mu_n$ represents a mean value of n initial scores obtained from the original images corresponding to $x_{mn}'$ using n groups of rules; On represents a variance of n initial scores obtained from the original images corresponding to $x_{mn}'$ using n groups of rules;

taking a mean value, a median value or a weighted value of the effective standard scores corresponding to each original image as an evaluation score of the current original image, wherein the evaluation score comprises: the image quality calculation score or the image content calculation score.

* * * * *